May 23, 1939.  C. BARTLETT ET AL  2,159,544

ROTARY ENGINE

Filed Feb. 12, 1937  4 Sheets-Sheet 4

Inventors
Clarence Bartlett
Lawrence Bartlett

By Clarence A. O'Brien
Hyman Berman
Attorneys

Patented May 23, 1939

2,159,544

UNITED STATES PATENT OFFICE 2,159,544

ROTARY ENGINE

Clarence Bartlett and Lawrence Bartlett,
Hartford, Ky.

Application February 12, 1937, Serial No. 125,498

1 Claim. (Cl. 123—15)

The present invention relates to new and useful improvements in internal combustion engines of the rotary type and has for one of its important objects to provide, in a manner as hereinafter set forth, an engine of this character embodying a novel construction and arrangement for compressing the fuel prior to the ignition thereof.

Another very important object of the invention is to provide a rotary internal combustion engine of the character described embodying novel means for actuating the fuel compressing mechanism.

Other objects of the invention are to provide a rotary internal combustion engine of the character set forth which will be comparatively simple in construction, strong, durable, highly efficient and reliable in operation, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 2:
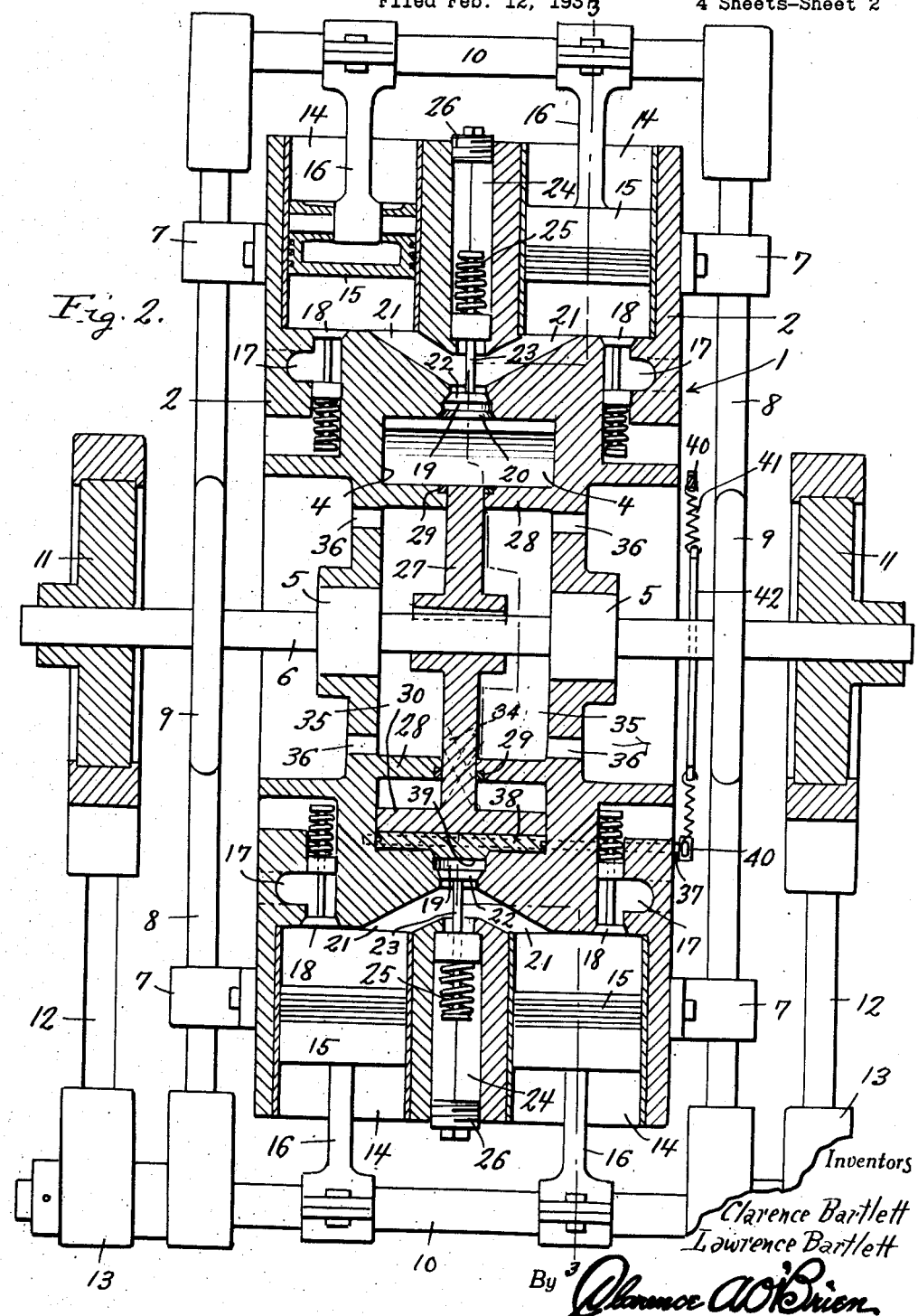
Figure 2 is a view in horizontal section, taken substantially on the line 2—2 of Fig. 3.

Referring now to the drawings in detail, it will be seen that the embodiment of the invention which has been illustrated comprises a housing of suitable metal which is designated generally by the reference numeral 1, said housing including a pair of complemental sections 2 which are secured together by bolts 3. The housing 1 is formed to provide an annular chamber 4 which, as illustrated to advantage in Fig. 2 of the drawings, is substantially rectangular in cross section. Journaled in bearings 5 in the housing 1 and extending through said housing is a main shaft 6.

Mounted on the sides of the housing 1 are guides 7 in which rods 8 are slidably mounted. The rods 8 include offset intermediate portions 9 which accommodate the shaft 6. Mounted on the ends of the rods 8 are shafts 10. The reference numeral 11 designates eccentrics which are fixed on the shaft 6 on opposite sides of the housing 1. The eccentrics 11 drive pitmans 12 which are connected to the end portions of one of the shafts 10 by suitable bearings 13. Projecting from the ends of the housing 1 are pairs of cylinders 14 in which fuel compressing pistons 15 reciprocate. Connecting rods 16 couple the pistons 15 to the shafts 10 for actuation thereby. The pistons 15 are adapted to draw fuel into the cylinders 14 from a carburetor (not shown) or any other suitable source of supply through passages 17 past spring seated check valves 18 at the inner ends of said cylinders.

Formed in the housing 1 on diametrically opposite sides of the annular chamber 4 and communicating therewith are compression and firing chambers 19 which communicate with said annular chamber 4 and which are formed to provide seats 20. Passages 21 connect the chambers 19 with the pairs of cylinders 14. The fuel under pressure is driven by the pistons 15 into the chambers 19 past spring seated check valves 22. The stems 23 of the valves 22 extend into chambers 24 which accommodate the springs 25 which close said valves 22. It will be noted that the chambers 24 are located between the pairs of cylinders 14. Removable plugs 26 close the chambers 24 at the outer ends thereof. It may be well to here state that the cylinders 14, the reciprocating pistons 15, etc., constitute fuel compressing pumps.

Fixed on the shaft 6 for operation in the housing 1 is a rotor 27. The rotor 27 is operable between annular flanges 28 which are formed in the complemental housing sections 2 and which, in conjunction with said rotor, form the inner periphery or wall of the annular chamber 4. Suitable rings 29 prevent leakage on opposite sides of the rotor 27. The rotor 27 includes a substantially segmental peripheral extension 30 of substantially T-shaped cross section which travels in the annular chamber 4. On one end of this substantially T-shaped portion 30 is a piston 31 which conforms in shape to the annular chamber 4 and which is adapted to travel therein. At one end, the piston 31 terminates in a cam like face 32. The other end of the portion 30 is in the form of a substantially cam like face 33. Exhaust ports 34 in the rotor 27 establish communication between the annular chamber 4 and chambers 35 in the housing 1 on opposite sides of said rotor. It will be observed that the exhaust ports 34 extend inwardly from the portion 30 past the annular flanges 28 of the housing sections 2 into the rotor 27. The chambers 35 are provided with discharge passages 36.

Figure 1:
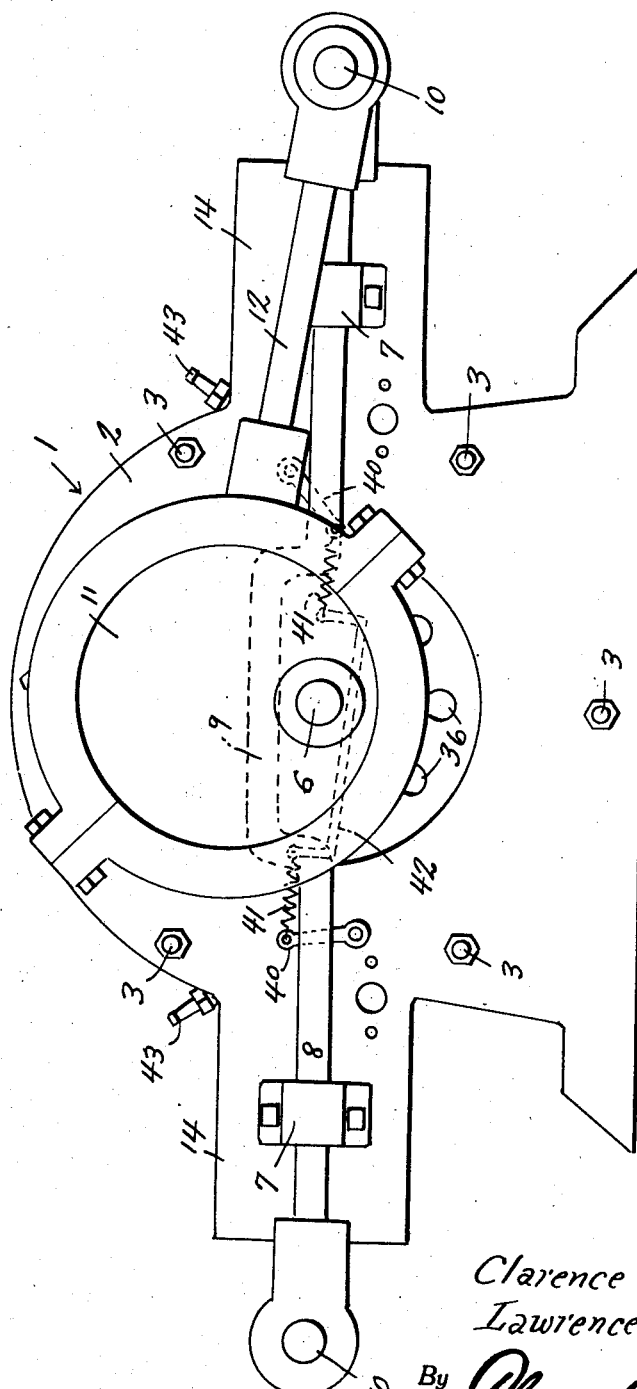
Figure 1 is a view in side elevation of a rotary engine constructed in accordance with the present invention.

Journaled in the housing 1, adjacent the chambers 19, are shafts 37. Fixed on the shafts 37 for swinging movement in the annular chamber 4 and adapted to ride on the periphery of the rotor 27 and the substantially T-shaped portion 30 thereof are abutments 38 having formed thereon valves 39 which are engageable with the seats 20. The shafts 37 project from one side of the housing 1 and fixed thereon are arms 40. Springs 41 and a substantially U-shaped member 42 (see Fig. 1) connect the arms 40 in a manner to yieldingly urge the abutments 38 into engagement with the rotor 27. Spark plugs 43 are provided for igniting the fuel in the chambers 19. Any suitable ignition system may be provided for controlling the spark plugs 43.

Figure 3:
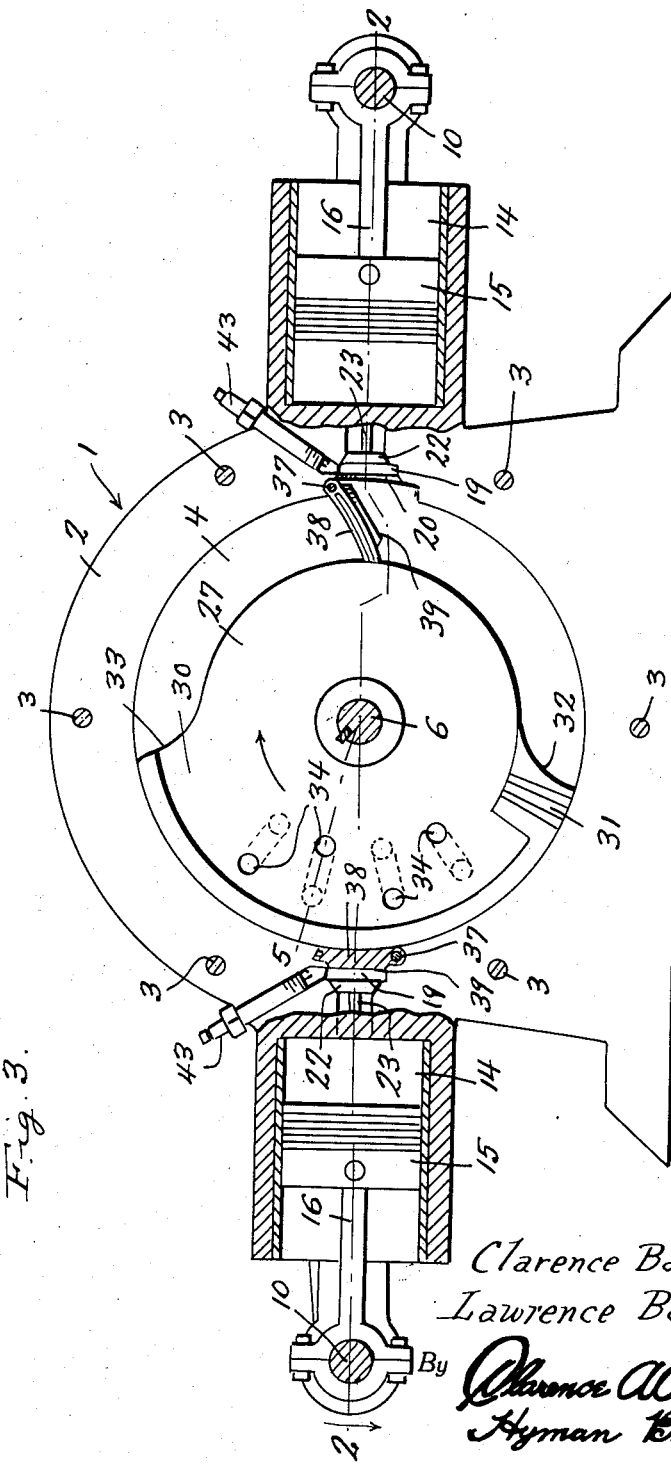
Figure 3 is an irregular vertical longitudinal sectional view, taken substantially on the line 3—3 of Fig. 2.
Figure 4:
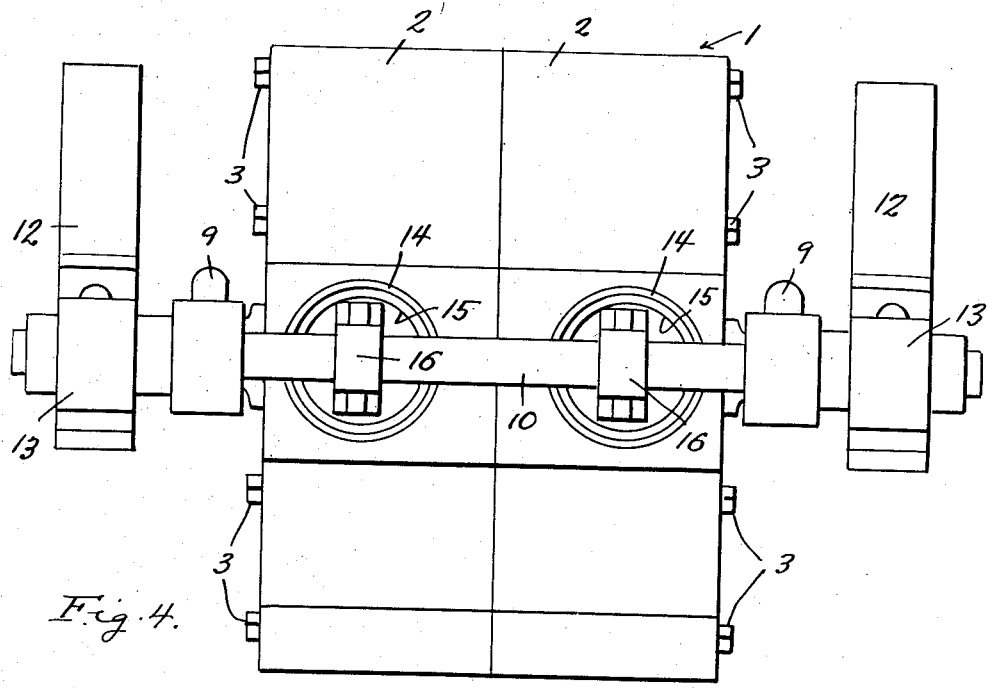
Figure 4 is a view in end elevation of the invention.
Figure 5:
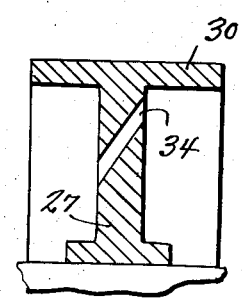
Figure 5 is a detail view in section through a portion of the rotor, taken substantially on the line 5—5 of Fig. 3.
Figure 6:
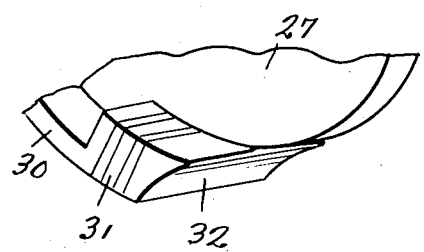
Figure 6 is a fragmentary view in perspective, showing a portion of the rotor and the piston thereon.

Briefly, the operation of the engine is substantially as follows:

As the shaft 6 rotates, the pistons 15 are caused to reciprocate in the cylinders 14 through the medium of the shafts 10, the rods 8, the pitmans 12, the eccentrics 11, etc. On the outward stroke of the pistons 15 fuel is drawn into the inner ends of the cylinders 14 where it is trapped by the valves 18. On the inward stroke of the pistons 15 this fuel is forced through the passages 21 past the valves 22 into the chambers 19 where it is highly compressed. The construction and arrangement is such that while the cylinders 14 on one end of the engine are intaking the cylinders 14 on the other end of said engine are discharging. When the abutments 38 are riding on the substantially T-shaped portions 30 of the rotor 27 said abutments close the chambers 19, the valves 39 being engaged with the seats 20. This is shown to advantage in Fig. 3 of the drawings. The rotor 27 travels in a clockwise direction as indicated by the arrow in Fig. 3 and when the piston 31 passes or clears the abutments 38 said abutments swing inwardly across the annular chamber 4, thus opening the combined compression and firing chamber 19. Substantially simultaneously with this operation ignition occurs and the abutment 38 which has just swung inwardly coacts with the piston 31 in a manner which is thought to be obvious. Of course, one of the abutments 38 is in open position while the other of said abutments is in closed position. As the abutments 38 are again swung outwardly by the portion 30 of the rotor 27 the exhaust gases may discharge through the ports 34.

As the cam face 32 of the piston 31 passes each abutment 38 the latter swings inwardly into open position behind said face and form together with said face a closed pocket in the chamber 4 for expansion of the exploding gas therein. Substantially simultaneously with this operation the cam 33 of portion 30 swings the other abutment 38 outwardly into closed position and together with the opened abutment traps the exhaust gas, of the previously exploded charge, therebetween in front of the piston 31 and forces said gas by way of exhaust ports 34 into chambers 35 for escape by way of ports 36.

It is believed that the many advantages of a rotary internal combustion engine constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

In a rotary internal combustion engine, a casing having an annular rotor chamber therein, a rotor in said chamber comprising a web in the plane of the chamber having a T-shaped sector like extension forming a circumferential flange fitting against the outer circumferential wall of said chamber and terminating at one end in a piston extending transversely of said chamber, a pair of gas inlet flap valves in said casing at diametrically opposite sides thereof closed alternately by wiping engagement of the extension past the same under rotation of said rotor in one direction and spring actuated to open inwardly of said chamber under control of said extension, said piston under rotation of the rotor in said one direction forming together with each valve in the open position of the latter a closed explosion pocket in said chamber in advance of the valve and an exhaust pocket in said chamber in the rear of the valve, said web extending through the inner wall of the chamber and being provided with oblique exhaust ports therein extending from the exhaust pocket inwardly of the casing beyond said inner wall of the chamber for the escape of exhaust gases out of said exhaust pocket.

CLARENCE BARTLETT.
LAWRENCE BARTLETT.